Nov. 25, 1969  D. T. BARISH  3,480,238
GLIDE WING
Filed Feb. 27, 1967
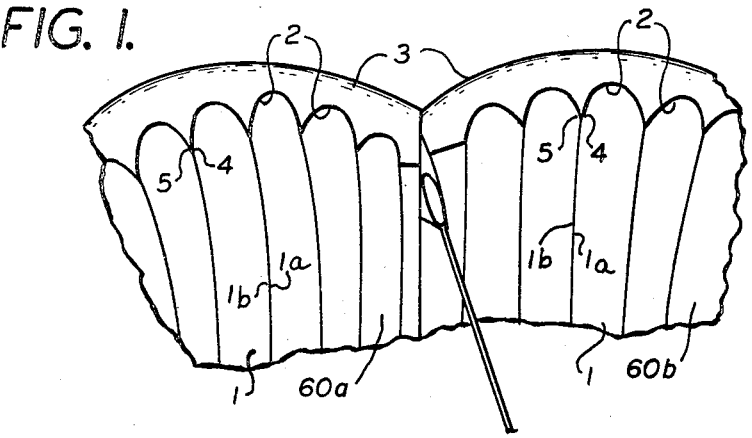
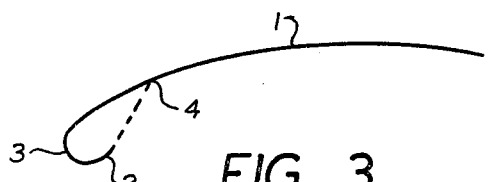
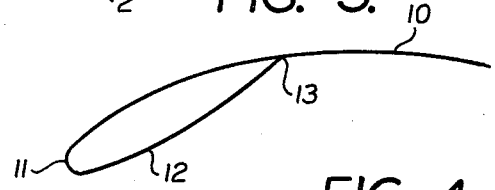
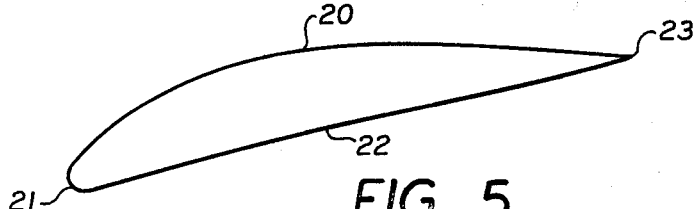
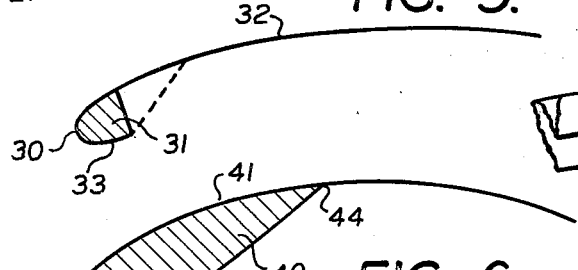
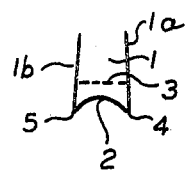
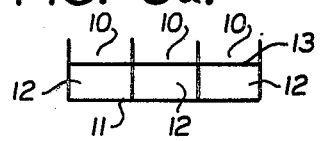
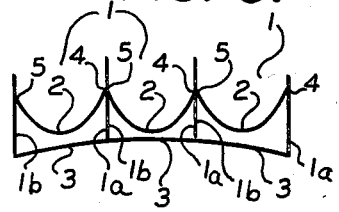
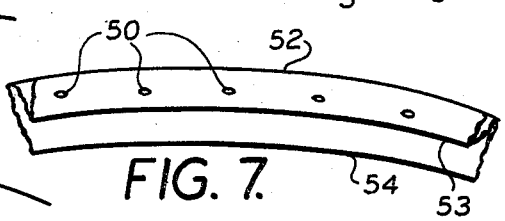
INVENTOR
DAVID T. BARISH
BY:
ATTORNEYS.

United States Patent Office 3,480,238
Patented Nov. 25, 1969

3,480,238
GLIDE WING
David T. Barish, New York, N.Y., assignor to Barish Associates, Inc., New York, N.Y., a United States corporation
Filed Feb. 27, 1967, Ser. No. 618,888
Int. Cl. B64d 17/02
U.S. Cl. 244—142
11 Claims

ABSTRACT OF THE DISCLOSURE

A flexible wing air foil having a leading edge which is arcuate shape in cross section.

---

This invention relates to glide wings.

This specification describes a glide wing having an arcuate-shaped leading edge.

Many types of parachutes are quite well known. Among the most common of all parachutes is the relatively conventional round type whose function is principally to slow the descent of a person or object falling from an airplane or other atmospheric vehicle. This conventional type of parachute has a limited lateral mobility and controllability during descent.

More recently, there have been developed various wing devices which have much in common with conventionally shaped parachutes, in that their principal purpose is to reduce the rate of descent of an object or person falling from an atmospheric vehicle, but exhibit many improvements over such round parachute in the ability to glide in a relatively horizontal direction. Further, these flexible wing devices are extremely maneuverable and directionally controllable.

It has been the usual practice in the past to provide all parachutes, of any size, shape of purpose, as a generally curved surface with the curvature being directed away from the ground. Thus, lifting forces, or at least descent-restraining forces, are provided either by reason of flow separating from the upper curved surface by reason of the flow stagnation in the concave side of the curved surface which serves to slow the rate of descent.

It is an object of this invention to provide improved glide wing construction.

It is another object of this invention to provide a flexible wing glide device having greater stability and controllability than has been possible in the past.

Other and additional objects of this invention will become apparent from a consideration of this entire specification, including the claims and drawing appended hereto.

In accord with and fulfilling these objects, one aspect of this invention resides in providing a substantially flexible parachute operable in the atmosphere, whose leading edge is at least partially a hollow toroidal section.

Understanding of this invention will be facilitated by reference to the accompanying drawing in which:

FIG. 1 is an isometric view of a portion of a glide wing having a leading edge according to this invention;

FIG. 2 is a sectional view through a portion of the leading edge of the glide wing of FIG. 1;

FIG. 2a is a plan view of one glide wing panel adapted to use in this invention;

FIG. 3 is a sectional view similar to FIG. 2 showing a modified leading edge according to this invention.

FIG. 3a is a bottom view of the leading edge configuration of FIG. 3;

FIG. 4 is a sectional view similar to FIGS. 2 and 3 showing a further modified leading edge configuration according to this invention;

FIG. 5 is a sectional view of a portion of a glide wing leading edge according to this invention;

FIG. 6 is a sectional view of a glide wing cross-section similar to FIG. 5;

FIG. 7 is a front elevation of a portion of the leading edge of a glide wing according to this invention; and FIG. 8 is a bottom view of a portion of the leading edge of a glide wing similar to that shown in cross-section in FIG. 2.

According to this invention, it has been found that the performance of parachutes in general, and flexible wing gliding devices in particular, is markedly improved by providing the leading edges thereof in an arcuate form both with relation to the periphery of the device and the cross-section of the leading edge thereof. The arcuate cross-section of the leading edge extends along the whole length of the leading edge. The general arcuate form of a parachute leading edge with respect to the periphery of the parachute is often an inherent fuction of the nature and structure of substantially any parachute. Thus, the combination of the lifting forces on the parachute occasioned by the atmosphere and the load forces on the parachute transmitted through the shroud and load lines often causes the leading edge to "buckle" into an arcuate shape at least along a portion of the leading edge thereof. See, for example, the shape of the leading edge 22 of the parachute of Buhler U.S. Patent 2,959,385. This substantially inherent arcuate form is distinguished from the leading edge structure of this invention in that this invention is directed to a glide wing leading edge which is arcuate in cross-section. Each section transversely taken through a leading edge of a parachute according to this invention is arcuate. In some cases, this arc may be a segment of a circle and in other cases, this arc may be a section of some other substantially smooth non-linear geometric function. Further, according to this invention, this leading edge which is arcuate in cross section may be, and usually is, longitudinally arcuate along the leading edge length.

Referring to FIGURE 1, there is shown two modules 60a and 60b forming the glide wing.

It is within the scope of this invention to provide the leading edge cross-section curvature in any manner considered desirable under the circumstances. For example, FIG. 2a shows an illustrative panel for use in a parachute according to this invention. It can be seen that, if the panel 1 has sides 1a and 1b with the base 2 provided in a convex configuration, when the panel is incorporated into a glide wing and the base 2 curled back under the remainder of the panel, for example, along a line 3, the ends 4 and 5 of the base can be affixed to the sides 1a and 1b respectively so as to provide a loose arcuate shape as is better seen in FIG. 1. This same mode of construction is also seen in FIG. 8 where an underside view of three panels joined together is shown. It should be noted that in this embodiment of this invention the material of the leading edge is not fully joined along its entire length, whereby a generally closed toroidal section shape would result, but rather that only portions of the flexible material of which the canopy is constructed are joined together at intervals to form a generally open arcuate section having spaced points at which the arc is closed, e.g., at 4 and 5 of FIG. 8.

It is preferred in this embodiment of this invention to provide the convex base 2 of the panel 1 in a catenary shape so as to efficiently distribute the stresses therealong. The catenary shaped base edge may be reinforced, if desired. This may be accomplished, for example, by rolling the edge and joining the rolled edge to itself to form a sort of welting alone or a line may be joined to the edge to reinforce it. Further, the base edge may be rolled into a hollow structure and a reinforcing line inserted therethrough.

In another embodiment of this invention, the leading edge of the glide wing can have a series of cross-sections wherein each, or at least most, are in a closed arcuate shape. For example, reference is made to FIGS. 3 and 3a, wherein there is shown a series of panels 10 having a leading edge 11 which is arcuate in shape and formed by loosely folding under and back a portion 12 of each panel and joining this folded under portion to the top portion of the panel along a line 13. While this line 13 can be positioned substantially anywhere along the panel, it has been found to be particularly desirable to position it about halfway along the length of each panel and to make it a generally smooth line from panel to panel. In the case of conventionally shaped round-form parachutes, there is no trailing edge, except possibly the apex air escape aperture, and so it is preferable to position the joining line intermediate between the peripheral leading edge and the canopy apex. In the case of glide types of flexible wings, there is both a leading and a trailing edge. In these constructions, it has been found desirable to provide the joining line intermediate between the leading and trailing edge of the wing or rotor. It has been found suitable to provide the point of juncture at a distance from the leading edge spaced therefrom at least about 10% of the total distance between the leading edge and the other edge of the canopy or wing, preferably about 30 to 70% of this distance.

It is a further embodiment of this invention to provide a parachute, and in particular a flexible glide wing or flexible rotor, in the shape of an air foil. This may be accomplished, as shown in FIG. 4, by providing an arcuate leading edge, as envisioned by this invention, and carrying the underportion of this edge all the way to the trailing edge of the flexible structure. In FIG. 4, the conventional parachute canopy, or glide wing, or rotor top surface 20 is provided with an arcuate leading edge 21 the underside 22 of which is joined in a substantially non-arcuate manner to the trailing edge 23. Where this air foil construction is utilized in connection with a "conventional" operable parachute, the air foil would extend from the peripheral leading edge of the parachute to the apex aperture thereof.

It is within the scope of this invention to provide and retain the arcuate configuration of the glide wing leading edge during flight in any manner and by means considered desirable under the circumstances of construction and operation prevailing. For example, by properly positioning and dimensioning the various portions of the flexible material making up the leading edge, it is possible and practical to make use of the balance of flow pressures acting on a parachute in flight to maintain the leading edge in an arcuate configuration. This, of course, may be the simplest means for accomplishing this desired result. There are instances, however, when it is necessary or desirable to provide the leading edge, and in fact the entire canopy, so structured that it is not possible to take full advantage of the balance of flow pressures to maintain the leading edge in a proper arcuate position and configuration during flight. Under these circumstances, it has been found to be desirable to provide some auxiliary means to produce and maintain the arcuate shape of the leading edge.

According to this invention, it has been found that it is possible to employ a rib within the arcuate leading edge. As shown in FIG. 5, a leading edge 30 is maintained in its proper arcuate position by means of a rib 31 positioned between the canopy 32 and the underside 33 of the leading edge. As shown in this FIG. 5, the leading edge may be constructed in a manner similar to that shown in FIG. 2 with the rib 31 provided along a chord line and filling out the entire leading edge, but only a portion of the entire space enclosed by the canopy and underside of the leading edge.

Further, as shown in FIG. 6, a reinforcing rib 40 may occupy the entire space enclosed by the canopy 41 and the underside 43 from the leading edge 42 to the point or line of juncture 44.

It has been found desirable in many parachute and/or glide wing constructions, to utilize reinforcing ribs within the arcuate leading edge and/or the entire air-foil construction thereof to maintain the design configuration and prevent either collapsing due to flow pressures or expanding as the case may be, depending upon the design configuration and its relationship to the flow pressures encountered in flight. It has often been found to be most necessary and desirable to prevent the arcuate leading edge and/or air-foil from expanding out of its design shape. In this embodiment of the invention, the rib can be and often is made up of a flexible material, suitably a textile and preferably the same material as is used for the canopy itself. In the alternative, under some design constructions, the balance of flow pressures is such that the arcuate leading edge and/or the entire air-foil may tend to be collapsed. Under these conditions, it is desirable to provide a semi-stiff rib, according to this invention. It is preferred, however, to design the arcuate leading edge and/or air-foil such that the balance of flow pressures tends to expand the arcuate leading edge and/or the air-foil and thus to use a flexible rib.

It is within the scope of this invention to provide ribs, where such are used, at points along the arcuate leading edge and/or air-foil which are intermediate the suspension lines extending from the parachute canopy. Additionally, there may be provided ribs at the points where one or more suspension lines are joined to the canopy.

It is within the scope of this invention to utilize reinforcing members within the arcuate leading edge which are not considered as ribs. For example, semi-stiff spares can be used in place of or in addition to ribs.

In a still further embodiment of this invention, it has surprisingly been found that the arcuate shape of the leading edge of a flexible glide wing can be maintained in a most simple and expedient manner. It is known that, as air or other fluids pass over or around a leading edge of a member, part of the air passes over and part under the leading edge. At some point or line of points on the surface of the leading edge, there is a stagnation point in air current direction; that is, there is a dividing line or point between the air passing over and the air passing under the leading edge. It has been found that, if small apertures are provided at spaced points along the line of stagnation points, air passing the leading edge tends to enter through these apertures into the space defined by the leading edge, the canopy surface and the underside, thereby causing these members to be filled out or expanded to their restraining dimensions and thereby provide and maintain the proper arcuate leading edge shape. While it is preferred to provide the described apertures at the stagnation point or line of the leading edge in order to maximize the effect of air pressure into the space behind the leading edge as defined above, it is not necessary or essential that these apertures are so positioned. It is within the spirit and scope of this invention to provide these apertures anywhere along the leading edge or adjacent members of the parachute so as to communicate the external air with the space behind the leading edge as defined. Further, it is prefered that the space behind the leading edge as defined above is substantially enclosed by the members recited. Again, this is not an absolutely essential requirement since this embodiment can be used with a leading edge structure such as shown in FIGS. 2 and 3.

Referring to FIG. 7, there is shown this embodiment of this invention where apertures 50 are provided in the arcuate leading edge 51 of a flexible glide wing having a canopy 52, an underside 53, and a trailing edge 54.

It is preferred in the practice of the asect of this invention, where apertures are provided in the arcuate leading edge, to size these apertures substantially smaller than the distances between suspension lines where such join the canopy. Thus, it is preferred that the arcuate leading edge is a substantially continuous material, preferably textile fabric, which has relatively small apertures therein. It is most preferred that these apertures are discontinuous and may even be widely separated. Certainly, the aperture cross-sectional area is less than the area of the fabric constituting the arcuate leading edge.

Glide wings made according to this invention may be conventional in construction in all aspects thereof, except the configuration of the leading edge which is arcuate in accord with this invention.

What is claimed is:
1. A flexible air foil glide-wing composed of a plurality of modules which modules comprises canopies of a substantially flexible, unsupported, conventional, textile-like parachute material, which canopies have camber from their leading to their trailing edges and have lateral sides, which leading edges are the forwardmost portion of said glide wing when said glide wing is in flight; and a multiplicity of suspension lines extending from said modules, at least some of which suspension lines depend from other than the leading edge of said modules; wherein said leading edges are conventional, textile-like parachute material which is flexible and contiguous with said canopies; the improvement which comprises said leading edges being members which are folded back along substantially the entire length of the leading edges from the forward portion from said canopies toward said trailing edges and are secured to said canopies at points of juncture, whereby defining a hollow space between said canopy, said leading edges and said folded back members; wherein said leading edges, canopies and folded back member assemblies have opening means to permit atmospheric air to pass at least partially transversely therethrough into said space during free flight; said leading edges being arcuate in cross-section along substantially the whole of the length thereof and being inflated, during free flight, along substantially the whole of the length thereof.

2. A wing as claimed in claim 1 wherein each said folded back member, said leading edge and said canopy are all a single sheet of clothlike material and wherein said folded back member is attached directly to said canopy.

3. A wing as claimed in claim 1 wherein said opening means comprises at least one aperture in said clothlike material.

4. A wing as claimed in claim 1 having at least one shape-retaining member in said hollow space.

5. A wing as claimed in claim 3 containing a multiplicity of apertures wherein the total cross-sectional area of said apertures is less than the total frontal area of said arcuate leading edge.

6. A wing as claimed in claim 1 composed of a multiplicity of said modules wherein at least some of said suspension lines are disposed between said leading and trailing edges.

7. A wing as claimed in claim 1, wherein said points of juncture are intermediate between said leading edge and the other edge of said material and spaced from said leading edge a distance of at least about 10% of the total distance between said leading and other edge.

8. A wing as claimed in claim 7 wherein said points of juncture are spaced from said leading edge about 30 to 70% of the total distance between said leading and other edge.

9. A wing as claimed in claim 1 having a trailing edge, wherein said point of juncture is said trailing edge.

10. A wing as claimed in claim 4, wherein said shaping member is a flexible rib.

11. A wing as claimed in claim 4, wherein said shaping member is at least one semi-stiff spar.

References Cited

UNITED STATES PATENTS

| 2,365,184 | 12/1944 | Frieder et al. | 244—145 |
| 2,959,385 | 11/1960 | Buhler | 244—145 |
| 3,104,857 | 9/1963 | Knacke et al. | 244—145 |
| 3,127,137 | 3/1964 | Downing | 244—145 |
| 3,309,045 | 3/1967 | Kinney | 244—153 |
| 3,335,985 | 8/1967 | Neal | 244—153 |

FOREIGN PATENTS 1,094,528  12/1954  France.

MILTON BUCHLER, Primary Examiner

T. W. BUCKMAN, Assistant Examiner

U.S. Cl. X.R.

244—145, 153, 146